US005561331A

United States Patent [19]

Suyama et al.

[11] Patent Number: 5,561,331

[45] Date of Patent: Oct. 1, 1996

[54] IGNITION KEY DEVICE HAVING CHARGEABLE STORAGE CELL SUPPLYING SELECTIVELY ATTACHABLE REMOTE UNIT

[75] Inventors: Kouichi Suyama, Wako; Masaaki Fukamachi, Miyazaki-gun, both of Japan

[73] Assignees: Honda Giken Kogyo Kabushiki Kaisha, Tokyo; Kabushiki Kaisha Honda Lock, Miyazaki-ken, both of Japan

[21] Appl. No.: 427,883

[22] Filed: Apr. 26, 1995

[30] Foreign Application Priority Data

Apr. 28, 1994 [JP] Japan .................................... 6-092562

[51] Int. Cl.$^{6}$ ..................................................... B60R 25/00

[52] U.S. Cl. ........................ 307/10.3; 70/456 R; 180/287; 340/825.69

[58] Field of Search .................................... 307/9.1–10.6, 307/150; 180/287, 289; 70/228, 252, 395, 456 R, DIG. 46; 320/2, 5, 6; 364/424.01, 424.03, 424.05; 340/425.5, 426, 461, 825.3–825.32, 825.34, 825.44, 825.69, 825.72

[56] References Cited

U.S. PATENT DOCUMENTS 3,973,422 8/1976 Cervera .................................. 70/456 R
4,733,638 3/1988 Anderson ................................ 180/287
4,965,460 10/1990 Tanaka et al. ......................... 307/10.2
5,220,319 6/1993 Kendel ............................... 340/825.69
5,254,996 10/1993 Claar et al. ............................ 340/426

FOREIGN PATENT DOCUMENTS 5-211724 8/1993 Japan .................................. 307/10.1
5-85388 12/1993 Japan .................................. 307/10.2

OTHER PUBLICATIONS

English language—Abstract of JP 62–1659, Jul. 1987, Horiuchi.

*Primary Examiner*—William M. Shoop, Jr.
*Assistant Examiner*—Richard T. Elms
*Attorney, Agent, or Firm*—Lyon & Lyon

[57] ABSTRACT

An ignition key device including an ignition key for use with a motor vehicle and a remote unit which is capable of remotely locking and unlocking a door of the motor vehicle and displaying information concerning and the status of the motor vehicle. A secondary cell is accommodated in the ignition key. When the ignition key is inserted into an ignition switch lock in the motor vehicle, the secondary cell is charged by a storage battery of the motor vehicle. When the ignition key is attached to the remote unit, the stored electric energy is supplied from the secondary cell to the remote unit to energize the remote unit for transmitting and receiving signals to perform the functions of remotely locking and unlocking a door of the motor vehicle and displaying information and the status of the motor vehicle. The ignition key can be detached from the remote unit. The ignition key device achieves a suitable weight balance between the ignition key and the remote unit, and allows the ignition key to be easily inserted into and removed from the ignition switch lock.

25 Claims, 9 Drawing Sheets

FIG.9A
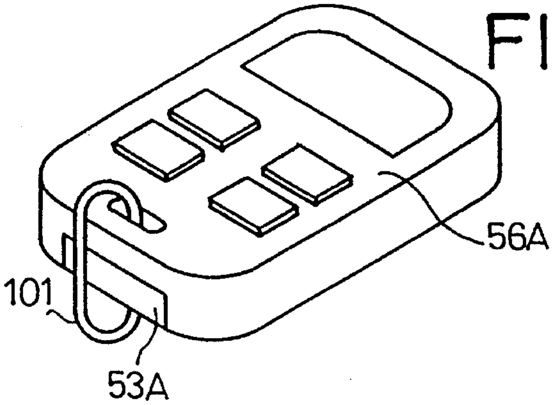
FIG.9B
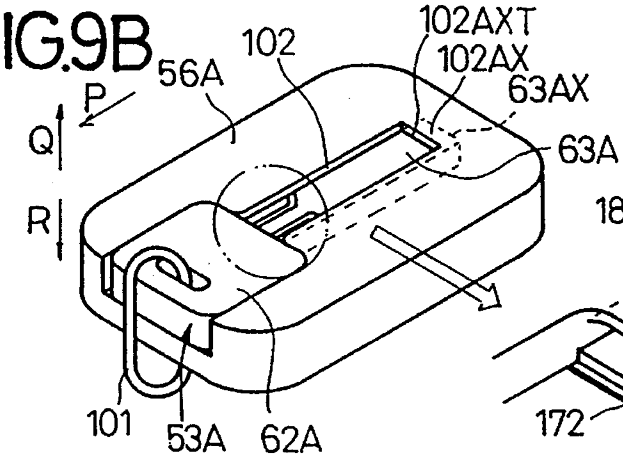
FIG.9F
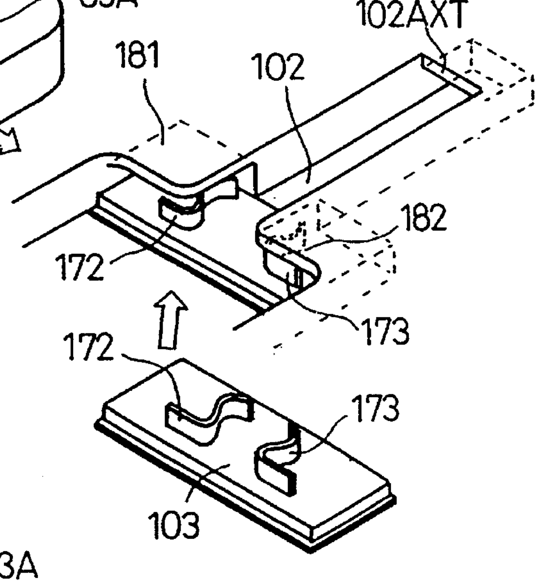
FIG.9C
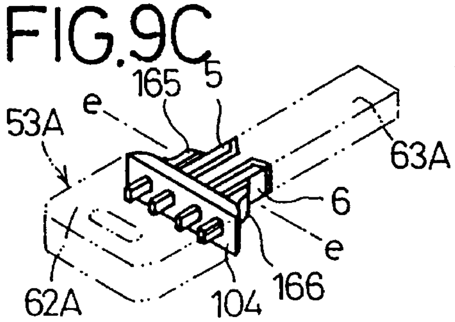
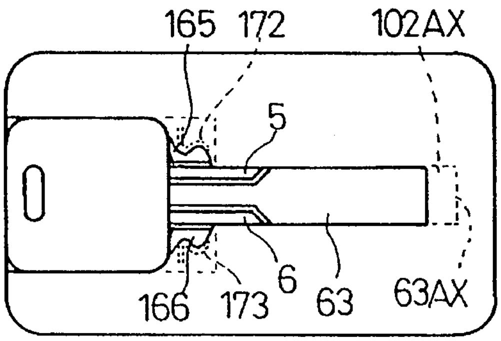
FIG.9D
FIG.9E
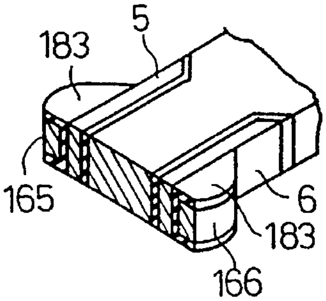

IGNITION KEY DEVICE HAVING CHARGEABLE STORAGE CELL SUPPLYING SELECTIVELY ATTACHABLE REMOTE UNIT

BACKGROUND OF THE INVENTION

1. Field of the Invention

The present invention relates to an ignition key device including an ignition key for use with a motor vehicle, the ignition key having means for remotely locking and unlocking a door of the motor vehicle and monitoring a status of the motor vehicle.

2. Description of the Prior Art

There has heretofore been known an ignition key device which comprises an ignition key to be inserted into an ignition switch of a motor vehicle and a remote door lock operating unit for remotely locking and unlocking a door of the motor vehicle, the ignition key and the device unit being integral with each other, as disclosed in Japanese patent publication No. 5-85388, for example.

The above publication also reveals an ignition key device comprising an ignition key and a remote door lock operating unit which are separate from each other and electrically connected to each other by two leads.

FIGS. 11 through 13 of the accompanying drawings show respective conventional ignition key devices 1, 11, 21 disclosed in the above publication. In FIGS. 11 through 13, corresponding parts of the conventional ignition key devices 1, 11, 21 are denoted by identical reference numerals.

The ignition key device 1 shown in FIG. 11 houses an electric circuit, which is schematically illustrated, including a diode bridge 2, a chargeable secondary cell 3, and a transmitter 4. The diode bridge 2 has input terminals connected to charging terminals 5, 6, respectively, and output terminals connected across the chargeable secondary cell 3 to the transmitter 4. The transmitter 4 is connected to a push-button switch 7 for locking and unlocking a door, and an antenna 8. The ignition key device 1 has a serrated portion 9 on one or both side edges thereof for performing a key function, i.e., turning on and off an ignition switch.

When the ignition key device 1 is inserted into the slot of an ignition switch lock (not shown) of a motor vehicle in the direction indicated by the arrow until the serrated portion 9 is placed in the slot of the ignition switch lock, a direct current flows from power supply terminals (not shown) that are positioned in the slot and connected to a battery on the motor vehicle to the ignition key device 1 through the charging terminals 5, 6. The direct current is supplied to charge the secondary cell 3 through the diode bridge 2.

When the ignition key device 1 is pulled out of the slot of the ignition switch, the transmitter 4 which is energized by the secondary cell 3 is armed.

When the push-button switch 7 is pressed while the transmitter 4 is armed, the transmitter 4 is operated to transmit a signal from the antenna 8 to a receiver on the motor vehicle. When the receiver on the motor vehicle receives the transmitted signal, a door of the motor vehicle is remotely locked or unlocked.

The ignition key device 11 shown in FIG. 12 comprises an ignition key 12 and a remote door lock operating unit 13 which are separate from each other and electrically and mechanically connected to each other by two insulated or protected leads 14. The ignition key 12 houses charging terminals 5, 6 and a diode bridge 2. FIG. 12 shows a detailed circuit of the diode bridge 2, which is identical to the diode bridge 2 shown in FIG. 11. The unit 13 accommodates a secondary cell 3 and a transmitter 4. The secondary cell 3 can be charged when a serrated portion 9 of the ignition key 12 is inserted into the slot of an ignition switch (not shown) of a motor vehicle.

The ignition key device 21 shown in FIG. 13 comprises an ignition key 22 and a remote door lock operating unit 23 which are separate from each other and electrically and mechanically connected to each other by two insulated or protected leads 14. The ignition key 22 houses charging terminals 5, 6. The unit 23 accommodates a diode bridge 2, a secondary cell 3, and a transmitter 4. The ignition key device 21 operates in the same manner as the ignition key device 11 shown in FIG. 12.

General ignition key devices of the type described above which are capable of locking and unlocking automobile doors and performing a key function, i.e., turning on and off an ignition switch, are required to be convenient in use. Specifically, the ignition key should easily be inserted into and pulled out of the ignition switch lock, should be resistant to damage or breakage, and should have a suitable size and weight. In addition, the secondary cell 3 must be capable of supplying electrical energy continuously for a long period of time while it is not being connected to a charging circuit.

The ignition key device 1 shown in FIG. 11 is relatively large in size as it has an integrally combined ignition key and remote door lock operating unit. Therefore, the ignition key device 1 may not conveniently be gripped by hand for insertion into or removal from the ignition switch, and hence may not be used with ease.

The ignition key devices 11, 21 shown in FIGS. 12 and 13 are relatively easy to use and free of the above problem of the ignition key device 1 shown in FIG. 11 because the ignition keys 12, 22 are separate from the respective remote door lock operating units 13, 23 and can be gripped by themselves for easy insertion into or removal from the ignition switch lock. However, the remote door lock operating units 13, 23 are still large and heavy and may not conveniently be handled or gripped by hand because of the relatively large and heavy components including at least the secondary cell 3 and the transmitter 4 that are incorporated in the units 13, 23.

Furthermore, the leads 14 which electrically and mechanically interconnect the ignition keys 12, 22 and the respective remote door lock operating units 13, 23 of the ignition key devices 11, 21 have to be covered with insulating layers or protective films, which are relatively expensive, so that the leads 14 are protected from wear, damage or breakage in repeated use.

In each of the ignition key devices 1, 11, 21 shown in FIGS. 11, 12, and 13, the secondary cell 3 is electrically connected to the transmitter 4 at all times. Consequently, while the secondary cell 3 is not being charged, i.e., while the ignition key is not inserted into the ignition switch lock or the ignition key is inserted into the ignition switch lock but the ignition switch is turned off, the secondary cell 3 continuously energizes the transmitter 4. Since the secondary cell 3 continuously consumes the stored electric energy, it cannot operate the ignition key devices 1, 11, 21 continuously for a long period of time after being charged.

SUMMARY OF THE INVENTION

It is an object of the present invention to provide an ignition key device which can be used highly conveniently.

Another object of the present invention is to provide an ignition key device which has a detachable ignition key that is relatively light, and has a suitable weight balance between the ignition key and a remote unit that is used therewith for, among other functions, operating the vehicle door locks.

Still another object of the present invention is to provide an ignition key device which includes an ignition key that can easily be inserted into and removed from an ignition switch lock because the ignition key is detached from the remote unit and then inserted into the ignition switch.

Yet still another object of the present invention is to provide an ignition key device which does not consume any electric energy stored in a storage cell when the remote unit is separated from the ignition key and used as a key holder because the storage cell is electrically disconnected from the remote unit at the time.

A further object of the present invention is to provide an ignition key device which has a remote unit and an ignition key that can be attached to and detached from each other without any electrical leads which would otherwise be needed to electrically and mechanically interconnect the remote unit and the ignition key.

According to the present invention, there is provided an ignition key device for use with an ignition switch lock in a motor vehicle, comprising a remote unit and an ignition key selectively attachable to and detachable from the remote unit, the ignition key having a storage cell which is chargeable upon being inserted into the ignition switch lock and is electrically connectable to the remote unit to supply stored electric energy to the remote unit when the ignition key is attached to the remote unit.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 9A is a perspective view of the ignition key device according to the embodiment shown in FIG. 8A, with the ignition key being mounted on the remote unit;

FIG. 9B is a perspective view of the ignition key device shown in FIG. 9A, the view showing the reverse side of the remote unit;

FIG. 9F is an enlarged fragmentary perspective view showing a groove in the reverse side of the remote unit of the ignition key device according to the embodiment shown in FIG. 8A;

FIG. 9C is a perspective view of a terminal base of the ignition key of the ignition key device according to the embodiment shown in FIG. 8A, the terminal base being integral with charging terminals and power supply terminals;

FIG. 9D is a bottom view of the ignition key device according to the embodiment shown in FIG. 8A, with the ignition key being mounted on the remote unit;

FIG. 9E is an enlarged fragmentary perspective view of the terminal base, showing a cross section taken along line "e"—"e" of FIG. 9C;

DETAILED DESCRIPTION OF THE PREFERRED EMBODIMENTS

Figure 1:
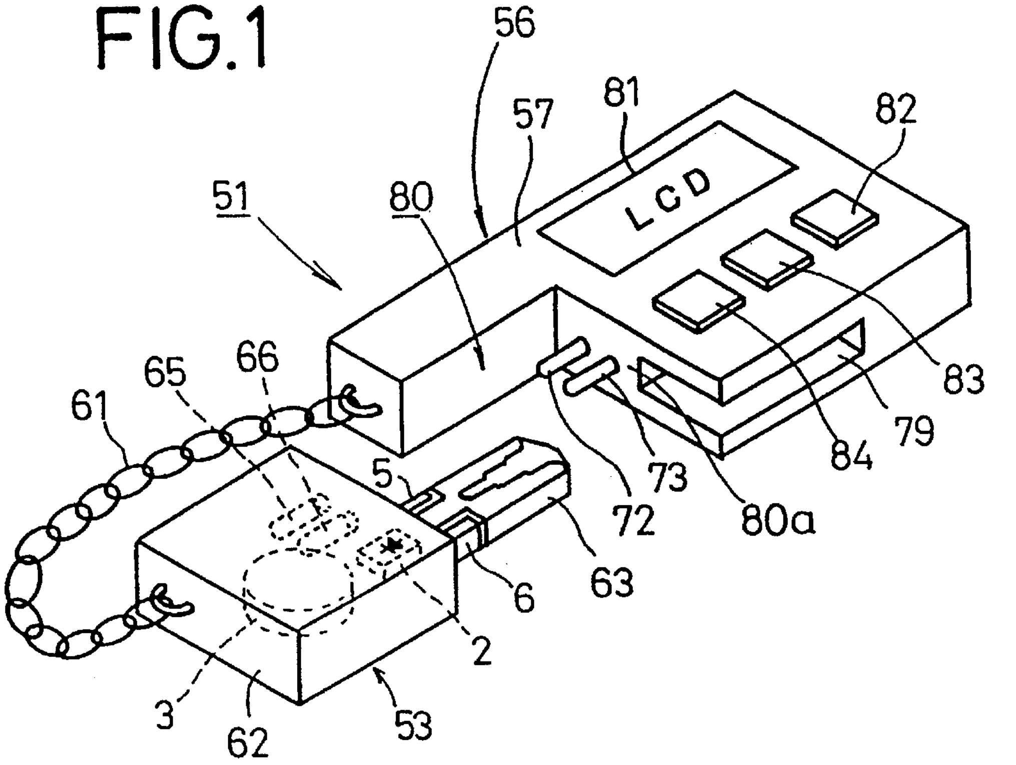
FIG. 1 is a perspective view of an ignition key device according to an embodiment of the present invention, the ignition key device including an ignition key and a remote unit which are shown as detached from each other, although joined by a chain.
Figure 2:
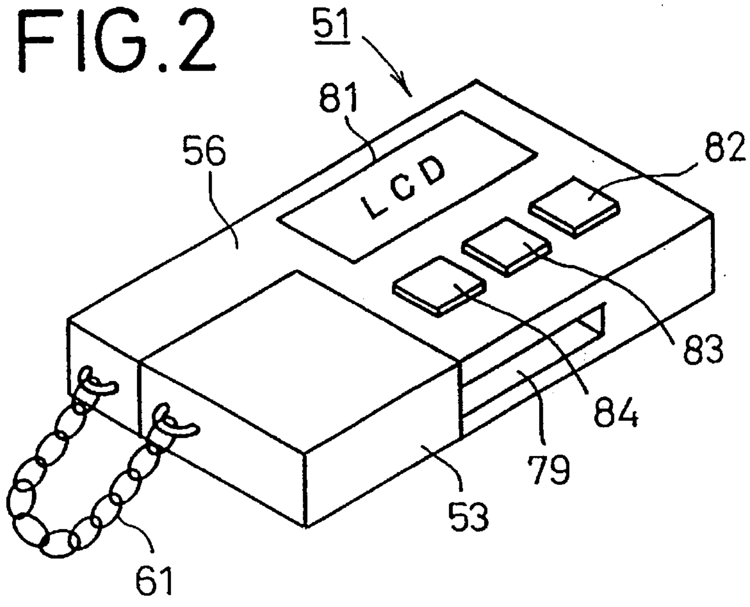
FIG. 2 is a perspective view of the ignition key device according to the embodiment shown in FIG. 1, the ignition key and the remote unit being shown as attached to each other.
Figure 3:
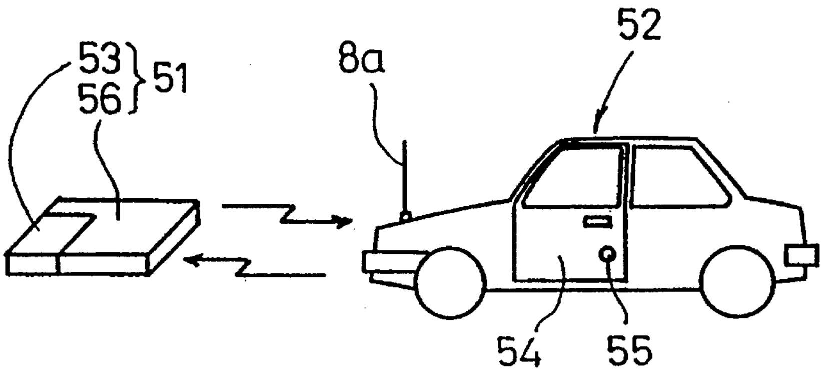
FIG. 3 is a schematic view showing the manner in which the ignition key device according to the embodiment shown in FIG. 1 operates with a motor vehicle.

FIGS. 1 and 2 show an ignition key device 51 according to an embodiment of the present invention. FIG. 3 shows the manner in which the ignition key device 51 shown in FIGS. 1 and 2 operates with a motor vehicle 52 such as a passenger automobile.

As shown in FIGS. 1 through 3, the ignition key device 51 comprises an ignition key 53 which can be inserted into the slot of an ignition key lock (not shown) of the motor vehicle 52, and a remote unit 56 for remotely locking and unlocking a door lock device 55 in a door 54 of the motor vehicle 52. The ignition key 53 and the remote unit 56 can be attached to and detached from each other.

The ignition key 53 and the remote unit 56 which is molded of a synthetic resin are loosely joined to each other by a chain 61 of a synthetic resin or metal. The remote unit 56 which is shown as detached from the ignition key 53 may be used as a key holder. No electric current flows through the chain 61.

Figure 4:
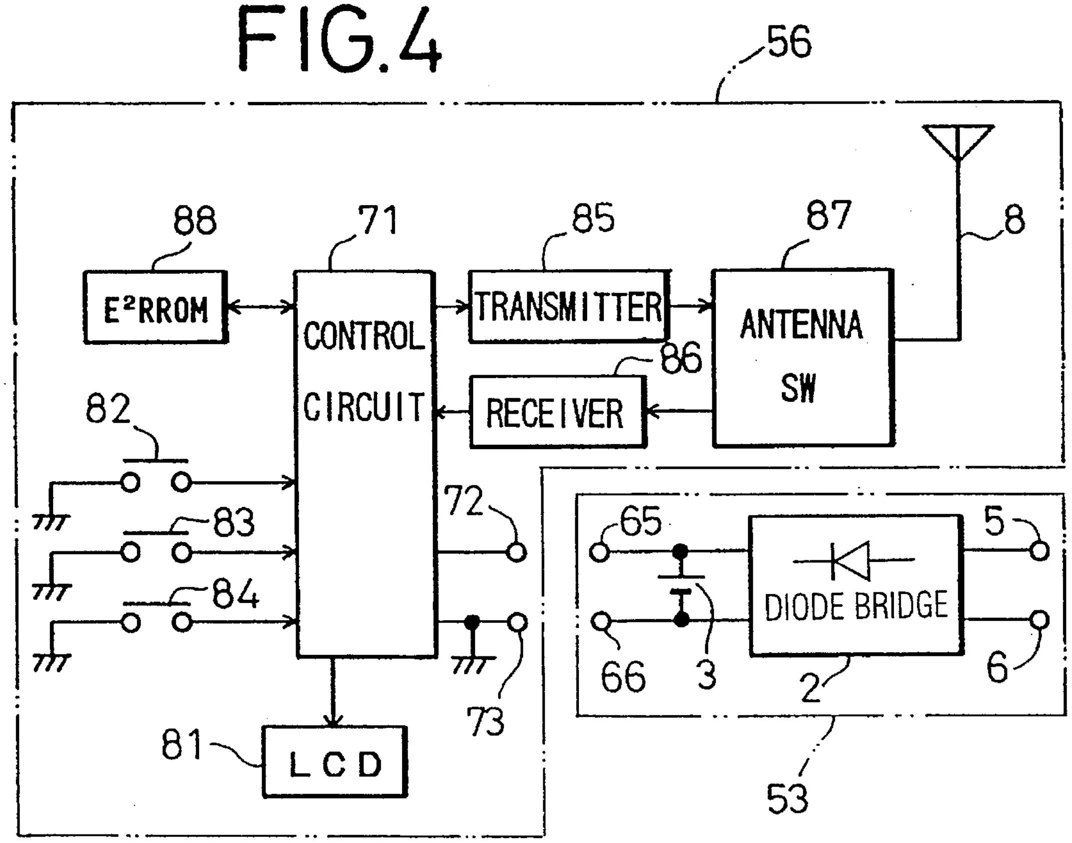
FIG. 4 is a block diagram of electric circuits in the ignition key and the remote unit of the ignition key device according to the embodiment shown in FIG. 1.

FIG. 4 shows electric circuits in the ignition key 53 and the remote unit 56.

Figure 12:
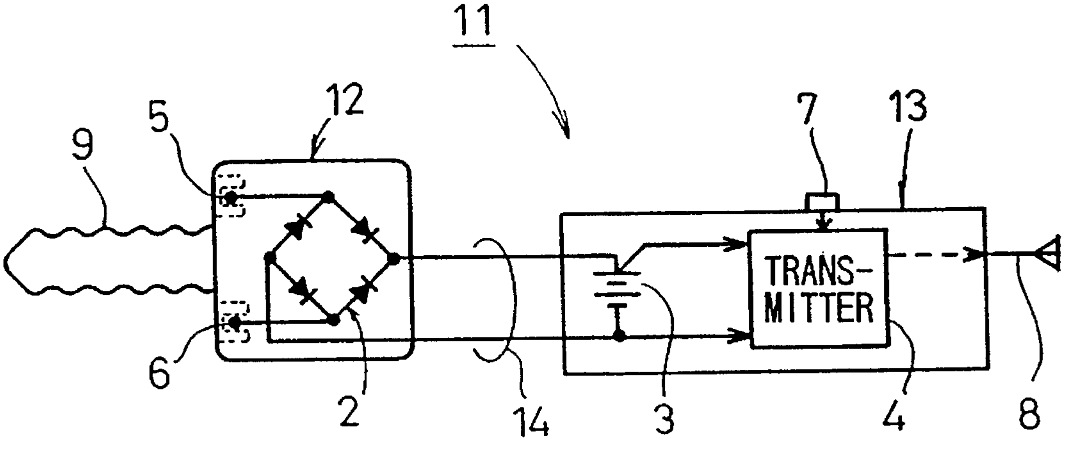
FIG.12 (Prior Art)
FIG. 12 is a schematic elevational view of another conventional ignition key device.
Figure 13:
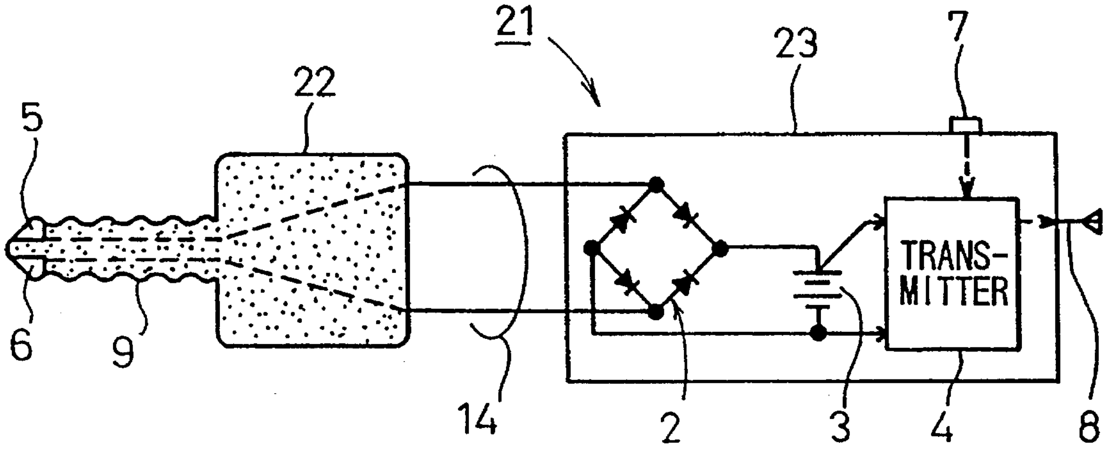
FIG.13 (Prior Art)
FIG. 13 is a schematic elevational view of still another conventional ignition key device.

As shown in FIG. 1, the ignition key 53 has a key top 62 molded of a synthetic resin and a key body 63 coupled thereto. The key body 63 has a pair of charging terminals 5, 6 (see also FIG. 4) mounted on its proximal end near the key top 62. The charging terminals 5, 6 are connected to input terminals of a diode bridge 2, which is of a structure identical to the diode bridge 2 shown in FIG. 12. The diode bridge 2 has output terminals connected to respective opposite terminals of a rechargeable, button-shaped storage battery cell (secondary cell) 3 which may be a nickel-cadmium cell, a lithium cell, or the like, and also to respective power supply terminals 65, 66 which serve as female terminals of a connector. Since the voltage across the cell 3 always appears at the power supply terminals 65, 66, the power supply terminals 65, 66 are embedded in the molded key top 62 to prevent them from being short-circuited by other components.

As indicated by the dashed lines in FIG. 1, the diode bridge 2 and the cell 3 are embedded together with the power supply terminals 65, 66 in the molded key top 62.

The key top 62 comprises a molded thin plate in the shape of a rectangular parallelepiped. The remote unit 56 is in the form of a thin plate which is also in the shape of a rectangular parallelepiped, the thin plate having a recess 80 defined in one corner thereof complementarily to the key top 62 for receiving the key top 62 therein. When the key top 62 is snugly fitted in the recess 80, as shown in FIG. 2, the key top 62 and the remote unit 56 are attached to each other and jointly make up a rectangular shape.

The remote unit 56 has a liquid crystal display (LCD) panel 81 mounted on a surface thereof for displaying information relative to the motor vehicle 52. The LCD panel 81 may be replaced with light-emitting diodes or the like.

The remote unit 56 also has, on its surface, push-button switches including a code transmission switch 82 for transmitting codes to lock and unlock the door lock device 55 of the motor vehicle 52, a vehicle information request switch 83 for requesting vehicle information, and a scroll switch 84 for scrolling a display image on the LCD panel 81.

The remote unit 56 further has a groove 79 defined therein which extends from an end wall surface 80*a* of the recess 80 toward, but terminates short of, an opposite end wall surface of the remote unit 56. The groove 79 is open at the end wall surface 80*a* and at a side wall surface of the remote unit 56. The groove 79 may be replaced with a hole. Power input terminals 72, 73 are mounted as male terminals of a connector on the end wall surface 80*a*.

As shown in FIG. 4, the remote unit 56 accommodates therein a control circuit 71 which includes a microprocessor unit (MPU), a read-only memory (ROM), a random-access memory (RAM), a power supply circuit, and so on. The power input terminals 72, 73 are connected to the control circuit 71. The ROM stores a system program for controlling operation of the remote unit 56.

The remote unit 56 also accommodates therein an electrically erasable programmable ROM (EEPROM) 88 for electrically erasing stored data and writing data, the LCD panel 81, the switches 82, 83, 84, a transmitter 85, and a receiver 86, which are all connected to the control circuit 71.

The transmitter 85 and the receiver 86 are connected to an antenna switch 87 that is also accommodated in the remote unit 56. The antenna switch 87 operates to connect an antenna 8 to the receiver 86 while the antenna 8 is receiving radio waves, and to connect the antenna 8 to the transmitter 85 otherwise.

Figure 5:
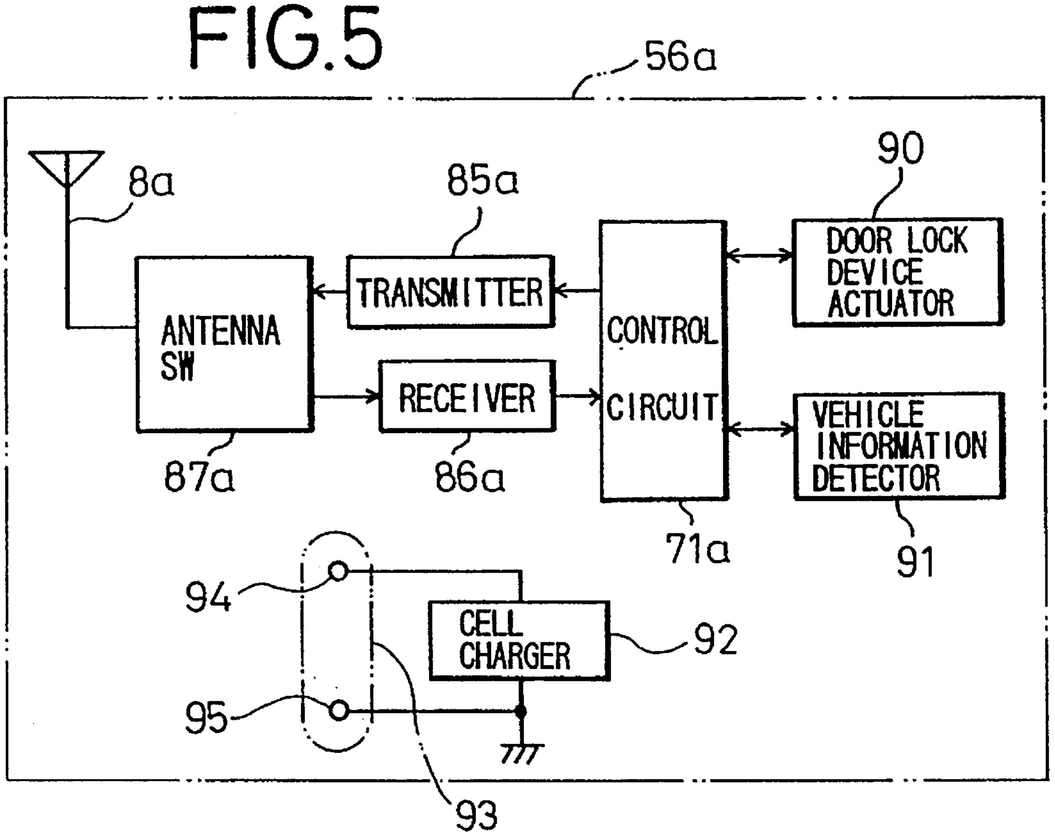
FIG. 5 is a block diagram of an electric circuit in the motor vehicle.

FIG. 5 shows a device 56*a* in the motor vehicle 52 which coacts with the ignition key device 51. Those components in the device 56*a* which are identical to those in the remote unit 56 are denoted by identical reference numerals with a suffix "a", and will not be described in detail below.

The device 56*a* has a door lock device actuator 90 and a vehicle information detector 91 which are connected to a control circuit 71*a*. Based on a signal from the vehicle information detector 91, the control circuit 71*a* produces lock/unlock information with respect to the door lock device 55, open/closed information with respect to the door 54, capacity information with respect to a battery (not shown) on the motor vehicle 52, operation information with respect to an air conditioning unit (not shown) including cabin temperature information, outside temperature information, and on/off information of the air conditioning unit, on/off information with respect to lamps on the motor vehicle 52, and other motor vehicle information representative of the amount of engine oil, the amount of window washer solution, and so on. The information concerning temperatures and air conditioning unit operation is particularly useful with an electric vehicle which may have the air conditioning unit operating while the vehicle's main battery is being recharged for preconditioning before travelling.

The device 56*a* has a cell charger 92 connected to the battery on the motor vehicle 52 for applying a voltage thereacross through power supply terminals 94, 95 which is disposed in the slot of an ignition switch lock 93 of the motor vehicle 52. The cell charger 92 is not limited to a battery charger for outputting a DC voltage from the battery on the motor vehicle, but may be a battery charger for outputting an AC voltage from a dynamo or alternator on the motor vehicle 52.

The ignition key device 51 and the device 56*a* in the motor vehicle 52 will operate as follows:

When the key body 63 of the ignition key 53 is inserted in the groove 79 of the remote unit 56 as shown in FIG. 2, the power supply terminals 65, 66 of the key top 62 are connected respectively to the power input terminals 72, 73 of the remote unit 56.

When the ignition key 53 and the remote unit 56 are thus integrally coupled to each other, forming the ignition key device 51 into a card-shaped configuration as shown in FIG. 2, the ignition key 53 and the remote unit 56 remain coupled to each other under holding forces from the connectors which are made up of the power supply terminals 65, 66 and the power input terminals 72, 73. In addition to the holding forces from the connectors, holding forces produced by other holding means such as a protrusion in the groove 79 may be additionally applied to keep the ignition key 53 and the remote unit 56 coupled to each other. Alternatively, the ignition key 53 and the remote unit 56 may be held together by interfitting convex and concave surfaces on mutually contacting walls of the key top 62 and the remote unit 56.

While the ignition key 53 and the remote unit 56 are coupled to each other, electric energy is supplied from the cell 3 through the power supply terminals 65, 66 and the power input terminals 72, 73 to the control circuit 71. The remote unit 56 is now armed or in an active state.

If the code transmission switch 82 on the remote unit 56 is pressed while the remote unit 56 is in the active state, then a code stored in the ROM in the control circuit 71 to match a code provided in the device 56*a* in the motor vehicle 52 is sent from the control circuit 71 through the transmitter 85 and the antenna switch 87 to the antenna 8, and transmitted from the antenna 8 as a radio wave signal.

The radio wave signal transmitted from the antenna 8 is then received by the antenna 8*a* of the device 56*a*, and supplied from the antenna 8*a* through an antenna switch 87*a* and a receiver 85*a* to the control circuit 71*a*. The control circuit 71a decodes the received radio wave signal back into the code provided from remote unit 56. The control circuit 71*a* then compares that code with a preset code stored in the ROM in the control circuit 71*a*. If the compared codes are the same as each other, the control circuit 71*a* controls the door lock device actuator 90 to lock or unlock the door lock device 55. Specifically, when the door lock device 55 is locked, the door lock device actuator 90 unlocks the door lock device 55, and when the door lock device 55 is unlocked, the door lock device actuator 90 locks the door lock device 55.

If the vehicle information request switch 83 on the remote unit 56 is pressed while the remote unit 56 is in the active state, then a request code stored in the ROM in the control circuit 71 is transmitted from the antenna 8 as a radio wave signal, and received by the device 56*a* and supplied to the control circuit 71*a* therein. The control circuit 71*a* decodes the radio wave signal back into the request code, and controls the vehicle information detector 91 to read present vehicle information. The read vehicle information is then sent as an information code from the control circuit 71*a* through the transmitter 85*a* and the antenna switch 87*a* to the antenna 8*a*, and transmitted from the antenna 8*a* as a radio wave signal.

The radio wave signal transmitted from the antenna 8*a* is then received by the antenna 8, and sent therefrom through the antenna switch 87 and the receiver 86 to the control circuit 71, from which the information code is stored in the EEPROM 88. The data stored in the EEPROM 88 is updated by the stored information code, and vehicle information represented by the information code is displayed on the LCD panel 81.

The vehicle information which is displayed on the LCD panel 81 for the user to monitor includes lock/unlock information with respect to the door lock device 55, open/closed information with respect to the door 54, capacity information with respect to the battery on the motor vehicle 52, operation information with respect to the air conditioning unit (not shown), on/off information with respect to the lamps on the motor vehicle 52, and other motor vehicle information.

These various items of vehicle information are successively displayed one at a time on the LCD panel 81 each time the scroll switch 84 is pressed.

If only lock/unlock information with respect to the door lock device 55 is to be displayed, then the vehicle information request switch 83, the scroll switch 84, and the LCD panel 81 may be dispensed with, and a light-emitting diode may be employed instead of the LCD panel 81. Such a modified arrangement will be described later on.

To operate the motor of the motor vehicle 52, the remote unit 56 and the key top 62 are gripped by both hands, respectively, of the user, and pulled away from each other thereby to remove the key body 63 from the groove 79 in the remote unit 56.

Then, the key top 62 is gripped and the key body 63 is inserted into the slot in the ignition switch lock 93 in the motor vehicle 52. Thereafter, the key body 63 is turned to a ON position (not shown) for thereby bringing the charging terminals 5, 6 into electric contact with the respective power supply terminals 94, 95 disposed in the slot in the ignition switch lock 93.

An electric current now flows from the cell charger 92 through the power supply terminals 94, 95 to the cell 3 to charge the cell 3. The cell 3 is automatically charged while the motor vehicle 52 is in operation. Therefore, the cell 3 does not need to be replaced with a new one. Since the cell 3 is automatically charged, the user is not required to be concerned about the charging of the cell 3.

After the key body 63 is pulled from the slot in the ignition switch lock 93, the ignition key 53 is mounted on the remote unit 56 again. Then, the cell 3 supplies electric energy to the remote unit 56. The remote unit 56 may have an automatic power-off function to turn off the LCD panel 81 and other circuits in the absence of any depression of the switches 82, 83, 84 for a certain period of time.

In this embodiment, the ignition key 53 is detachably attached to the remote unit 56, and loosely joined to the remote unit 56 by the chain 61, and the secondary cell 3 is embedded in the key top 62 of the ignition key 53.

Accordingly, the ignition key 53 is of a suitable weight, and the remote unit 56 is relatively light and small for easy handling as no cell is incorporated in the remote unit 56.

For inserting the key body 63 into the ignition switch lock 93, the key body 63 is removed from the remote unit 56, and then inserted into the ignition switch lock 93 while only the key top 62 is being gripped. Therefore, the key body 63 can easily be inserted into and pulled from the slot in the ignition switch lock 93.

While the remote unit 56 and the ignition key 53 are electrically disconnected from each other, the remote unit 56 acts as conventional key holder or ring. At this time, the electric energy stored in the cell 3 is not consumed. Furthermore, since the remote unit 56 and the ignition key 53 are mechanically joined to each other by the chain 61 even while they are electrically disconnected from each other, the ignition key 53 will not easily be lost inadvertently.

Inasmuch as the remote unit 56 and the ignition key 53 are electrically and mechanically connected to each other by the connectors, no electrical wire leads are necessary, and hence the ignition key device 51 is highly reliable for repeated use. The ignition key device 51 is therefore highly portable and easy to use, while still allowing the ignition key 53 to be handled conveniently.

Figure 6:
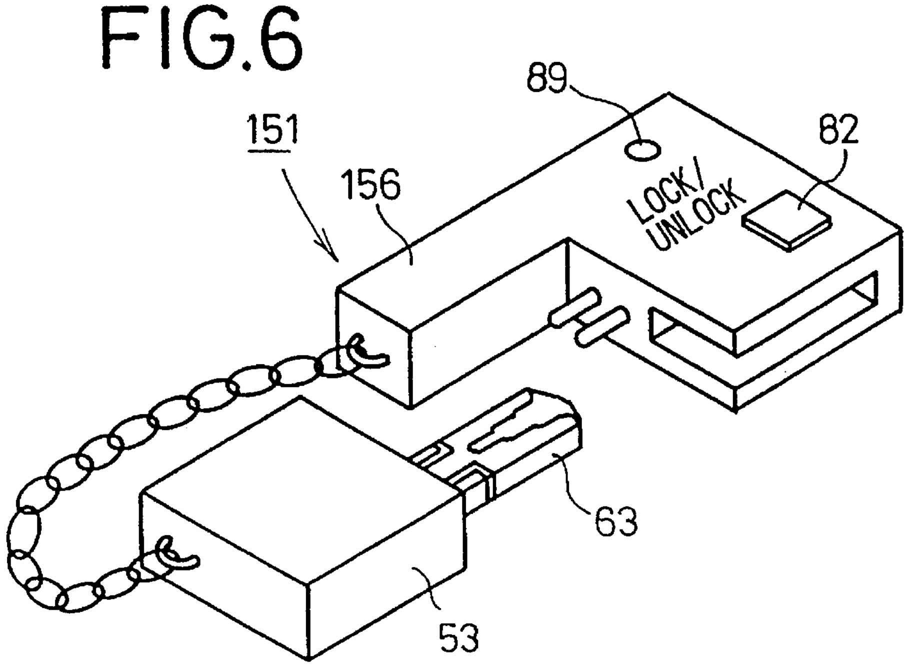
FIG. 6 is a perspective view of an ignition key device according to another embodiment of the present invention, the ignition key device including an ignition key and a remote unit which are shown as detached from each other.
Figure 7:
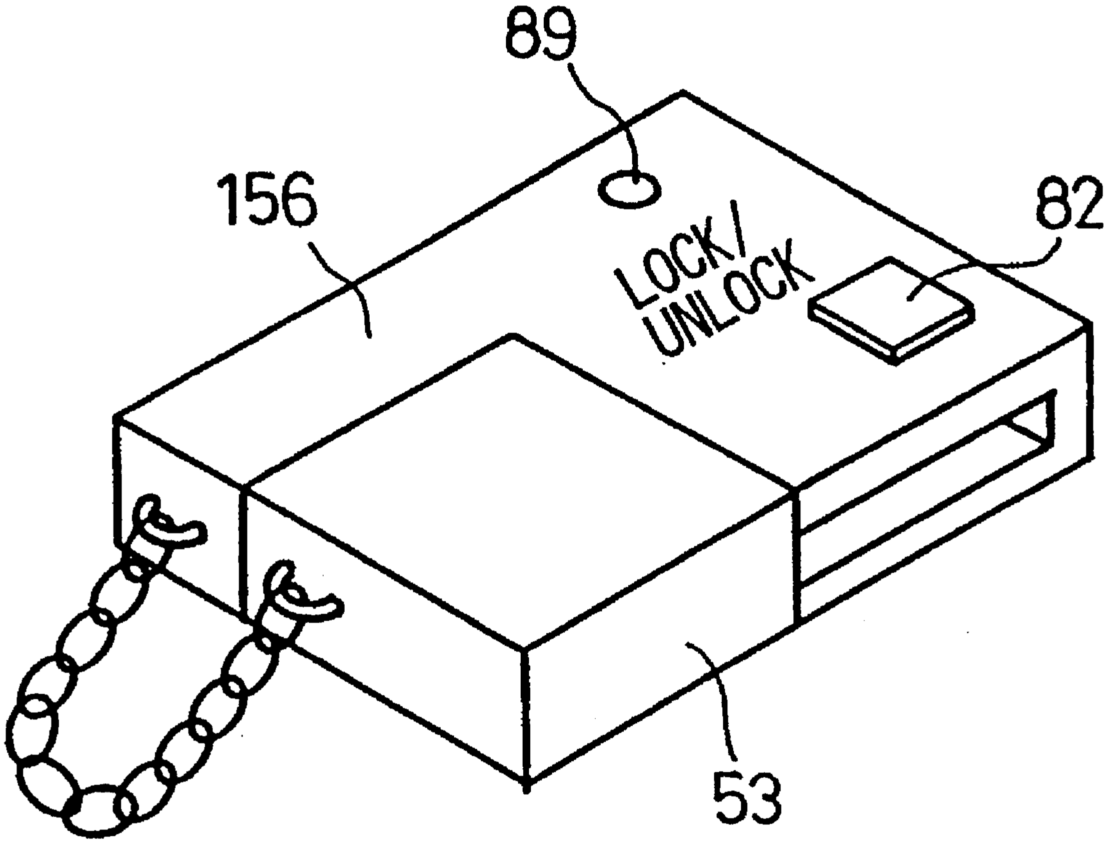
FIG. 7 is a perspective view of the ignition key device according to the embodiment shown in FIG. 6, the ignition key and the remote unit being shown as attached to each other.

FIGS. 6 and 7 show an ignition key device 151 according to another embodiment of the present invention, the ignition key device 151 including an ignition key and a remote unit which are shown as detached from each other in FIG. 6 and attached to each other in FIG. 7. Those parts of the ignition key device 151 which correspond to those of the ignition key device 51 shown in FIGS. 1 and 2 are denoted by identical or corresponding reference numerals.

The ignition key device 151 is designed to display only lock/unlock information with respect to the door lock device 55. The ignition key device 151 includes an ignition key 53 and a remote unit 156. The remote unit 156 has a code transmission switch 82 for transmitting codes to lock and unlock the door lock device 55 (see FIG. 3) and a light-emitting diode 89 on its surface, but does not have the vehicle information request switch 83, the scroll switch 84, and the LCD panel 81 which are disposed on the remote unit 56 shown in FIG. 1.

In FIG. 6, the ignition key 53 is detached from the remote unit 156. In FIG. 7, the ignition key 53 is attached to the remote unit 156, forming the ignition key device 151 into a card-shaped configuration.

In the embodiment shown in FIGS. 6 and 7, the light-emitting diode 89 is of the type which is capable of selectively emitting light in different colors, e.g., red and green. The remote unit 156 also has letters "LOCK/UNLOCK"

printed on its surface near the light-emitting diode 89. The letters "LOCK" are printed as green letters representing a safety condition, and the letters "UNLOCK" are printed as red letters representing a warning condition.

When the code transmission switch 82 is pressed once, the ignition key device 151 locks or unlocks the door lock device 55, and lock/unlock information with respect to the door lock device 55 is transmitted from the motor vehicle 52 to the ignition key device 151. If the door lock device 55 is locked, then the light-emitting diode 96 emits light in green. If the door lock device 55 is unlocked, then the light-emitting diode 96 emits light in red. Consequently, the user can clearly recognize whether the door lock device 55 is locked or unlocked even in the dark.

Although the ignition key device 151 shown in FIGS. 6 and 7 is less capable of displaying motor vehicle information than the ignition key device 51 shown in FIGS. 1 and 2, the ignition key device 151 is smaller and lighter than the ignition key device 51 because the volume of the remote unit 156 is about two-thirds of the volume of the remote unit 56.

Figure 8A:
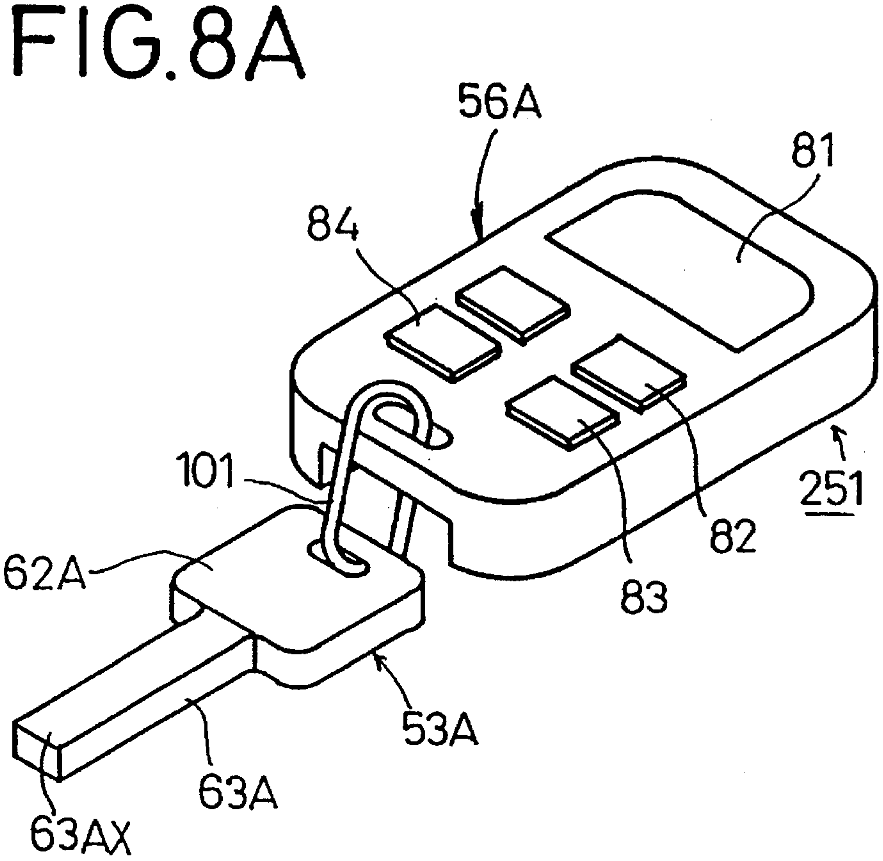
FIG. 8A is a perspective view of an ignition key device according to still another embodiment of the present invention with an ignition key detached from a remote unit, the view showing a face side of the ignition key device.
Figure 8B:
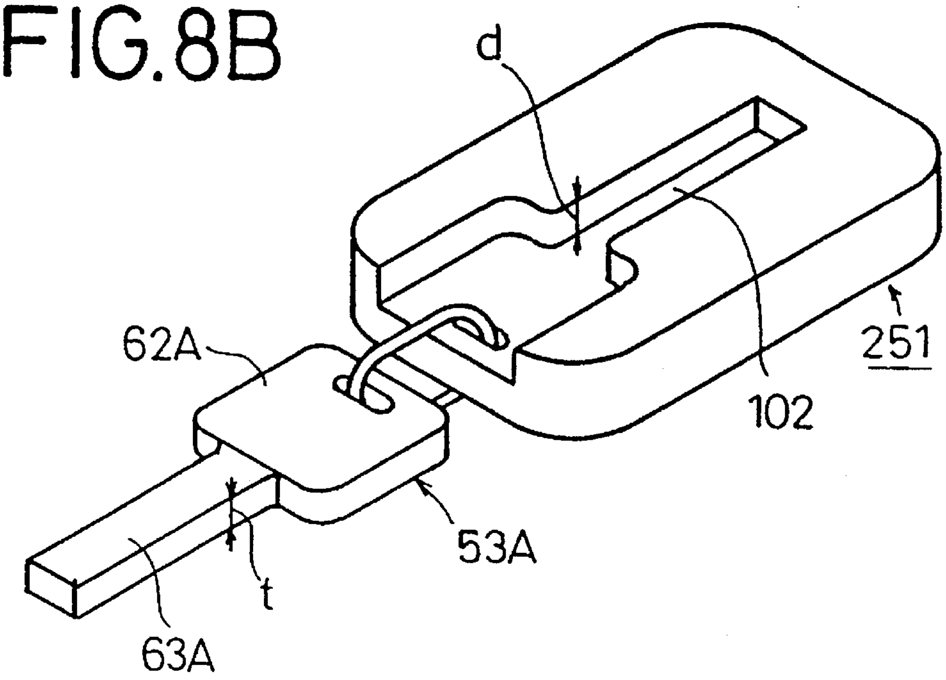
FIG. 8B is a perspective view of the ignition key device according to the embodiment shown in FIG. 8A, the view showing a reverse side of the ignition key device.

FIGS. 8A and 8B illustrate an ignition key device 251 according to according to still another embodiment of the present invention. Structural details of a detachable region of the ignition key device 251 are shown in FIGS. 9A through 9E, which also show how the ignition key device 251 is used and operates. Those parts of the ignition key device 251 which correspond to those of the ignition key device 51 shown in FIGS. 1 and 2 are denoted by identical or corresponding reference numerals.

As shown in FIGS. 8A and 8B, the ignition key device 251 has an ignition key 53A and a remote unit 56A. In FIGS. 8A and 8B, the ignition key 53A and the remote unit 56A are shown as detached from each other, but mechanically joined to each other by a ring 101, and the remote unit 56A is used as a key holder. The ignition key 53A and the remote unit 56A may be mechanically joined to each other by a chain similar to the chain 61 shown in FIG. 1.

FIG. 8A shows a face side of the remote unit 56A in the form of a thin plate, and FIG. 8B shows a reverse side of the remote unit 56A. The reverse side of the remote unit 56A has a groove 102 defined therein complementarily to the entire shape of the ignition key 53A, which comprises a key top 62A and a key body 63A. When the ignition key 53A is placed in the groove 102, electric energy is supplied from a cell (not shown) embedded in the key top 62A to the remote unit 56A to place the remote unit 56A in an active condition.

FIG. 9A shows the face side of the ignition key device 251 with the ignition key 53A put in the groove 102 in the reverse side of the remote unit 56A. The ignition key 53A has identical convex and concave patterns on its face and reverse sides such that the ignition key 53A can be put snugly in the groove 102 irrespective of whether the face or reverse side of the ignition key 53A is held against the bottom of the groove 102.

FIG. 9B shows the reverse side of the ignition key device 251 with the ignition key 53A placed in the groove 102.

As shown in FIG. 9B, when the ignition key 53A is placed in the groove 102, the key body 63A has a tip end 63AX positioned in a cavity 102AX in the distal end of the groove 102 and covered with and engaged by a thin upper wall 102AXT (see also FIG. 9F) of the cavity 102AX. The groove 102 has a depth "d" (see FIG. 8B) which is greater than the thickness "t" of the key body 63A substantially by the thickness of the thin upper wall 102AXT. For detaching the ignition key 53A from the remote unit 56A, the ignition key 53A is slightly shifted in the direction indicated by the arrow P, and then the distal end of the key top 62A is pushed in the direction indicated by the arrow Q or R.

FIG. 9F shows in greater detail a portion of the groove 102 which corresponds to a portion of the ignition key 53A which extends from the boundary between the key top 62A and the key body 63A to the key body 63A. As shown in FIG. 9B', an integral assembly composed of an insulating terminal base 103 and a pair of springy and electrically conductive power input terminals 172, 173 of phosphor bronze is bonded by an adhesive to the bottom of the portion of the groove 102 which corresponds to the boundary between the key top 62A and the key body 63A. The power input terminals 172, 173 are connected to a control circuit embedded in the remote unit 56A.

The power input terminals 172, 173 have respective springy curved portions. When the springy curved portions of the power input terminals 172, 173 are brought into contact with respective power supply terminals 165, 166 of the ignition key 53A, the power input terminals 172, 173 are electrically connected to the power supply terminals 165, 166, as shown in FIG. 9D.

The ignition key 53A placed in the groove 102 is mechanically held on the remote unit 56A under elastic forces produced when the power supply terminals 165, 166 and the power input terminals 172, 173 are engaged with each other and also elastic and frictional forces exerted on the tip end 63AX of the key body 63A by the thin wall 102AXT of the cavity 102AX when the tip end 63AX is placed in the cavity 102AX. If the elastic forces produced when the power supply terminals 165, 166 and the power input terminals 172, 173 are engaged with each other are sufficiently large, then the elastic and frictional forces exerted by the thin wall 102AXT of the cavity 102AX may not be necessary, and the tip end 63AX may simply be covered with, but not engaged by, the thin wall 102AXT. The power input terminals 172, 173 are covered with and protected by respective thin cover walls or layers 181, 182 which lie in overhanging relation to the bottom of the groove 102.

FIG. 9C shows an integral assembly of the ignition key 53A composed of an insulating terminal base 104, a pair of charging terminals 5, 6, and the pair of power supply terminals 165, 166. The integral assembly shown in FIG. 9C is securely incorporated in the proximal end of the key body 63A when the key top 62A and the key body 63A are integrally combined with each other.

FIG. 9E shows a cross section of the integrally molded assembly taken along line "e"—"e" of FIG. 9C. As shown in FIG. 9E, the face and reverse sides of the power supply terminals 165, 166 are covered with insulating layers 183 such that only the sides of the power supply terminals 165, 166 are exposed for contact with the power input terminals 172, 173. The insulating layers 183 are molded of a synthetic resin that is used in the production of the integral assembly shown in FIG. 9C. Since the face and reverse sides of the power supply terminals 165, 166 are covered with the insulating layers 183, the power supply terminals 165, 166 are prevented from being short-circuited to each other accidentally by an electrically conductive member such as a coin, a pin, or the like even when the ignition key 53A is detached from the remote unit 56A.

Figure 10:
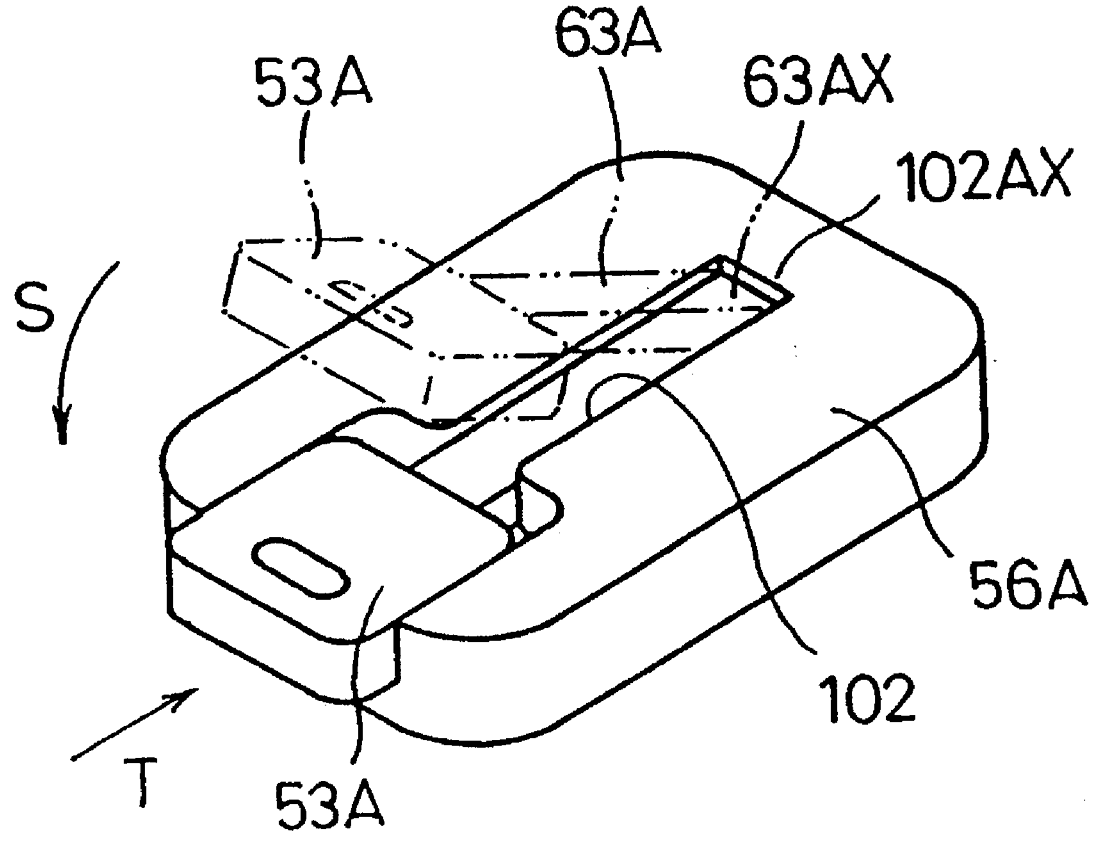
FIG. 10 is a perspective view showing the manner in which the ignition key disconnected from the remote unit is placed into the groove in the remote unit of the ignition key device according to the embodiment shown in FIG. 8A.
Figure 11:
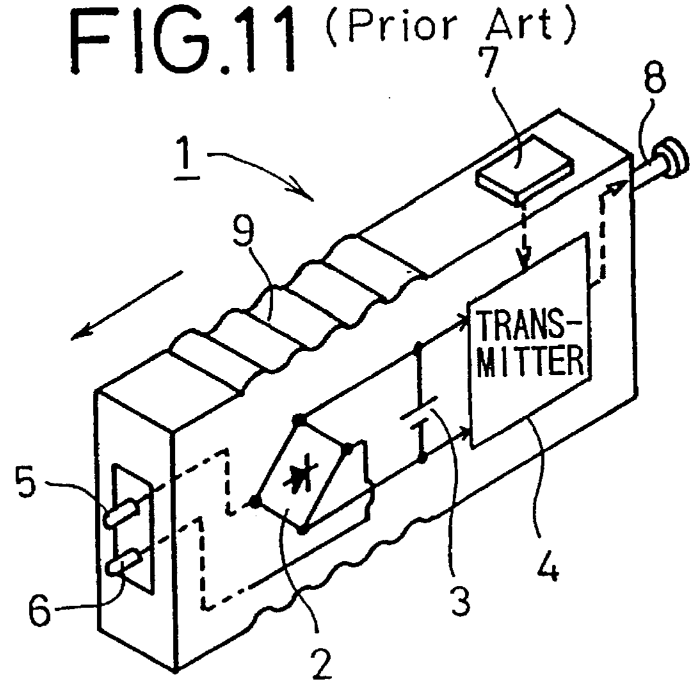
FIG.11 (Prior Art)
FIG. 11 is a perspective view of a conventional ignition key device having an ignition key and a remote door lock operating unit that are integral with each other.

FIG. 10 shows the manner in which the ignition key 53A is placed into the groove 102 in the remote unit 56A if the ignition key 53A and the remote unit 56A are not joined to each other by the ring 101, but separate from each other or joined to each other by a chain (not shown). To place the ignition key 53A into the groove 102, the ignition key 53A is tilted with respect to the remote unit 56A, and the tip end 63AX of the key body 63A is inserted into the cavity 102AX, after which the ignition key 53A is pushed toward the remote unit 56A in the direction indicated by the arrow S. Then, when the face or reverse side of the key body 53A, whichever may be selected to face the groove 102, is held against the bottom of the groove 102, i.e., when the ignition key 53A and the remote unit 56A become parallel to each other, the ignition key 53A is slid in the direction indicated by the arrow T until the ignition key 53A is placed in its entirety in the groove 102. In this manner, the ignition key 53A is attached to the remote unit 56A.

In all of the above embodiments, a radio wave signal is used to transmit the necessary information between the ignition key devices 51, 151, 251 and the motor vehicle 52. However, an infrared radiation signal may be used to transmit the necessary information between the ignition key devices 51, 151, 251 and the motor vehicle 52. The ignition key devices 51, 151, 251 are usable with internal combustion engine or electric motor powered vehicles or any other type of vehicle.

Although certain preferred embodiments of the present invention have been shown and described in detail, it should be understood that various changes and modifications may be made therein without departing from the scope of the appended claims.

What is claimed is:

1. An ignition key device for use with an ignition switch lock in a motor vehicle, comprising:

a remote unit; and an ignition key selectively attachable to and detachable from said remote unit, said ignition key having a storage cell which is chargeable upon being inserted into the ignition switch lock and is electrically connectable to said remote unit to supply stored electric energy from said storage cell to said remote unit when said ignition key is attached to said remote unit.

2. An ignition key device according to claim 1, wherein said remote unit is shaped substantially as a thin plate and has a groove defined in one surface thereof for detachably receiving said ignition key therein.

3. An ignition key device according to claim 1, wherein said remote unit has transmitting means for transmitting a lock/unlock signal to the motor vehicle.

4. An ignition key device according to claim 3, wherein said remote unit has means for displaying information relative to the motor vehicle.

5. An ignition key device according to claim 1, wherein said remote unit is integrally molded of a synthetic resin.

6. An ignition key device according to claim 1, further comprising flexible joint means for joining said ignition key and said remote unit to each other.

7. An ignition key device according to claim 6, wherein said flexible joint means comprises a chain.

8. An ignition key device according to claim 7, wherein said flexible joint means comprises means for preventing an electric current from flowing therethrough.

9. An ignition key device according to claim 1, wherein said ignition key comprises a key top and a key body coupled thereto.

10. An ignition key device according to claim 9, wherein said ignition key has charging terminals disposed on a proximal end of said key body and electrically connected to said storage cell.

11. An ignition key device according to claim 10, wherein said storage cell is embedded in said ignition key, further comprising a first connector supported by said ignition key and electrically connected to said storage cell and a second connector supported by said remote unit for engaging said first connector, the arrangement being such that said ignition key and said remote unit remain attached to each other by engagement of said first connector and said second connector.

12. An ignition key device according to claim 11, wherein said first connector comprises a female connector and said second connector comprises a male connector.

13. An ignition key device according to claim 9, wherein said remote unit has a recess defined therein complementarily to said key top, the arrangement being such that said ignition key and said remote unit form a rectangular shape when attached to each other with said key top fitted in said recess.

14. An ignition key device according to claim 1, wherein said remote unit has display means for displaying information relative to the motor vehicle.

15. An ignition key device according to claim 14, wherein said display means comprises a liquid crystal display panel.

16. An ignition key device according to claim 1, wherein said remote unit has a switch for transmitting a lock/unlock code with respect to a door lock device on the motor vehicle.

17. An ignition key device according to claim 9, wherein said remote unit has a groove defined therein for receiving said key body therein.

18. An ignition key device according to claim 9, wherein said remote unit has a groove defined therein complementarily to said ignition key for receiving said ignition key therein.

19. An ignition key device according to claim 1, wherein said remote unit has a groove defined in a surface thereof for receiving said ignition key therein, and springy and electrically conductive power input terminals disposed in said groove for electric connection to said storage cell.

20. An ignition key device according to claim 6, wherein said flexible joint means comprises a ring.

21. An ignition key device according to claim 14, wherein said display means comprises a light-emitting diode.

22. An ignition key device for use with an ignition switch lock in a motor vehicle, comprising:

a remote unit having means for transmitting signals to the motor vehicle; and an ignition key having a storage cell and being selectively attachable to said remote unit for supplying electrical energy to said transmitting means.

23. An ignition key device according to claim 22 wherein the ignition switch lock includes electric energy supply terminals and said storage cell is electrically recharged upon being inserted into the ignition switch lock.

24. An ignition key device according to claim 22, wherein said remote unit includes receiving means for receiving signals from the motor vehicle.

25. An ignition key device according to claim 24, wherein said remote unit has means for displaying information based on the signals received from the motor vehicle.

* * * * *